UNITED STATES PATENT OFFICE.

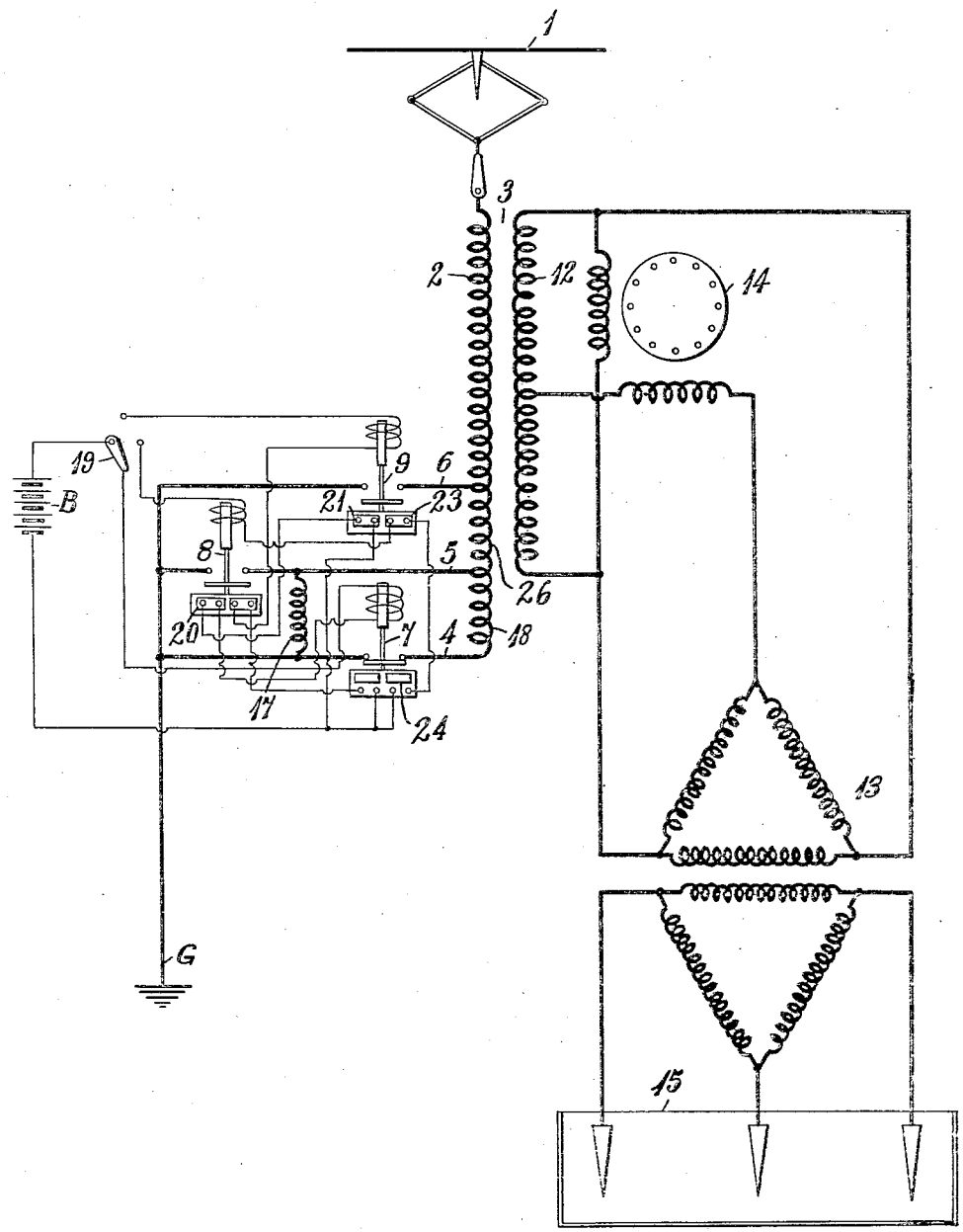

KARL A. SIMMON AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,231,658.   Specification of Letters Patent.   Patented July 3, 1917.

Application filed April 6, 1914. Serial No. 830,097.

*To all whom it may concern:*

Be it known that we, KARL A. SIMMON, a citizen of the United States, and a resident of Wilkinsburg, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Control Systems, of which the following is a specification.

Our invention relates to control systems for dynamo-electric machines, and it has special reference to alternating current control systems embodying induction motors.

One of the objects of our invention is to provide a system of the character referred to, in which an induction motor is adapted to be operated from a transformer having a plurality of different voltage taps to which connections may be selectively made for the purpose of varying the operating characteristics of the motor, under different service conditions.

Another object of our invention is to provide simple and effective means for selectively establishing connections to any one of the transformer taps without interrupting the main circuit connections and, moreover, without effecting a local short-circuit upon any portion of the transformer winding.

It is a more specific object of our invention to provide means, involving as many switches as there are transformer taps, for selectively making connections to said taps, and to provide a translating device or preventive coil for limiting the current and preventing local short-circuits upon the transformer winding and, moreover, to provide interlocking means for permitting the closure of only a single switch at a time.

It has been customary in the past to employ a plurality of preventive coils and switches for the purpose of stepping-up from one transformer tap to another without interrupting the main circuit or effecting a local short-circuit, but all such schemes with which we are familiar involve the use of a relatively large number of switches and preventive coils which render the system complicated and expensive.

According to our invention, we propose to accomplish the ends hereinbefore mentioned, and to do so with a minimum number of switches and other auxiliary apparatus. For illustrative purposes, we have shown our invention in connection with a system for controlling the operation of a polyphase induction motor which receives energy from a single-phase trolley conductor through the agency of a single-phase transformer and a phase converter. However, it should be understood that our invention is not in any sense restricted to systems of this particular character, but is applicable to any system in which it is desirable to establish connections to any one of a plurality of different voltage taps of a winding of a transformer or other electrical apparatus.

Our invention may best be understood by reference to the accompanying drawing, the single figure of which is a diagrammatic view of a system embodying our invention.

Referring to the drawing, a supply circuit conductor 1, shown as a trolley conductor for an electric railway system, supplies single-phase energy to a primary winding 2 of a transformer 3, the winding 2 being provided with a plurality of different voltage taps 4, 5 and 6 which are adapted to be selectively connected to a return circuit conductor G by means of a plurality of independently operated electrically governed switches 7, 8 and 9. The transformer 3 also embodies a secondary winding 12 which delivers energy to a polyphase induction motor 13 through a phase converter 14, the operation of motor 13 being controlled by a suitable adjustable rheostat 15.

Inasmuch as our invention resides in the means for selectively connecting to any of the transformer taps 4, 5 and 6, and pertains only indirectly to the particular type of system embodying a phase converter and polyphase induction motor, no detailed description of that portion of the system is deemed necessary. If desired, reference may be made to a co-pending application, Serial No. 808,714, filed by Benjamin G. Lamme, and assigned to the Westinghouse Electric & Manufacturing Company, which discloses this portion of the system in full.

The several switches 7, 8 and 9 are of well-known construction and are respectively adapted to establish connections between the supply circuit conductor G and the transformer taps 4, 5 and 6 which are preferably located on the low-tension side of the transformer winding 2. It should be noted that the switches 7, 8 and 9 correspond in number to the transformer taps 4, 5 and 6. Furthermore, a translating device or preventive coil 17 is provided which is connected between the intermediate tap 5 on the "live" side of switch 8 and the ground side of the switch 7 which is adapted to establish a connection to the lowest transformer tap 4. The preventive coil 17, therefore, is permanently connected in circuit and is traversed by the exciting current of the transformer winding 2, in case none of the switches 7, 8 and 9 are closed. It is not desirable, however, that such conditions obtain during operation and, hence, switch 7 is normally closed to connect the preventive coil 17 across the lower section 18 of the transformer winding 2.

Assuming normal operating conditions to obtain and the circuit connections to be as shown in the drawing, a circuit is completed from the positive side of a battery B, or other suitable source of energy, which includes a manually operated switching device 19, energizing coil of switch 7, an interlock switch 20 associated with switch 8 and an interlock switch 21 of switch 9, to the negative side of the battery. Thus, switch 7 is held closed, provided switches 8 and 9 occupy their open positions.

If the voltage of the supply circuit 1 is materially lowered, from any cause whatsoever, it is clear that the torque of the driving induction motor 13 is materially reduced, in accordance with well-known principles. In order to restore normal operating conditions and secure the desired motor operation, it is possible to increase the voltage supplied to the driving motor 13 by shifting the connection of the supply circuit conductor G to the one or the other of transformer taps 5 and 6. By so doing, the number of active turns of the primary winding 2 is reduced, thereby increasing the volts per turn, and, consequently, increasing the transformer secondary and motor voltage.

In order to accomplish this result, switch device 19 is moved to its intermediate position, thereby deënergizing the operating coil of switch 7, and completing a circuit from the positive side of the battery B which includes switching device 19, the energizing coil of switch 8, interlock switch 23 of switch 9, and interlock switch 24 of switch 7 to the negative side of the battery.

Immediately upon the deënergization of the operating coil of switch 7, said switch is opened and the only connection between the supply circuit conductor G and the transformer 2 is then through the preventive coil 17, which obviates an interruption of the main circuit connection. As soon, however, as the energizing coil of switch 8 is excited, which can be done only when both the switches 7 and 9 occupy their open positions, the switch 8 closes to directly connect the supply conductor G to the intermediate transformer tap 5 and to incidentally short-circuit the preventive coil 17.

By reason of the interlocking of one switch with another, it is impossible to establish a local short-circuit across the section 18 of the transformer winding 2 and, moreover, no open circuit transition is effected in stepping from tap to another.

Having thus decreased the number of transformer primary turns and accordingly increased the secondary voltage supplied to the driving motor 13, the operating conditions are improved. If this adjustment is insufficient to restore normal conditions, the switching device 19 may be moved to its uppermost position to permit switch 8 to open and to subsequently establish a connection for closing switch 9, provided switches 7 and 8 are opened. No detail recitation of the circuit connections will be given on account of their similarity to those hereinbefore set forth. Attention is called, however, to the fact that, when switch 8 has been permitted to open, the preventive coil 17 is temporarily included in circuit until switch 9 has been closed. The closure of switch 9 connects the supply conductor G directly to the transformer tap 6 and concurrently connects the preventive coil 17 in multiple to section 26 of the transformer winding 2. This transition from transformer tap 5 to tap 6 is effected without locally short-circuiting any portion of the transformer winding 2 and, moreover, without interrupting the main circuit connection of the transformer winding. Under these conditions, it is assumed that normal operating conditions are restored and that the driving motor 13 operates to produce its normal torque.

A consideration of the system, as hereinbefore set forth, makes it evident that, in comparison with other systems for accomplishing similar purposes, a relatively small number of switches is employed, namely, one switch for each transformer tap, and only a single preventive coil is necessitated. The system, therefore, is particularly simple and inexpensive, while it effectively and reliably attains the desired ends.

It will, of course, be understood that a larger number of transformer taps may be employed by correspondingly increasing the number of switches and preventive coils. Furthermore, other modifications in the circuit connections and arrangement and location of parts may be effected within the scope of our invention.

We claim as our invention:

1. The combination with an electrical winding having three voltage taps, and a conductor adapted to be connected thereto, of three switches severally connected between said conductor and the respective voltage taps, and a translating device permanently connected at two points to the intermediate tap and to said conductor, respectively.

2. The combination with an electrical winding having three voltage taps, and a conductor adapted to be connected thereto, of three switches severally connected between said conductor and the respective voltage taps, a translating device permanently connected between the intermediate tap and said conductor, and means for preventing more than one switch being closed at a time.

3. The combination with an electrical winding having three voltage taps, and a conductor adapted to be connected thereto, of three switches severally connected between said conductor and the respective voltage taps, a translating device permanently connected between the intermediate tap and said conductor, electrical means for selectively controlling the operation of said switches, and electrical interlocking means associated with the switches for preventing the concurrent closure of a plurality of switches.

4. The combination with an electrical winding having three voltage taps, and a conductor adapted to be connected thereto, of a translating device permanently connected between the intermediate tap and said conductor, and three switches for connecting said conductor directly to any of said taps without short-circuiting any portion of said winding and without open-circuiting the connection between said conductor and said winding.

5. The combination with an electrical winding having a plurality of voltage taps, and a conductor adapted to be connected thereto, of a single translating device, and as many switches as there are voltage taps for selectively connecting said conductor directly to any of said taps without short-circuiting any portion of said winding and without opening the connection between the conductor and said winding.

6. The combination with an electrical apparatus having a winding, and a supply circuit comprising a high and a low-tension conductor adapted to be connected to the respective ends of said winding, of a plurality of switches severally connected between the low-tension conductor and a plurality of different voltage points in said winding, and a translating device connected between one side of one switch and the opposite side of the adjacent switch.

7. The combination with an electrical apparatus having a winding, and a supply circuit comprising a high and a low-tension conductor adapted to be connected to the respective ends of said winding, of a plurality of switches severally connected between the low-tension conductor and a plurality of different voltage points in said winding, a translating device connected between one side of one switch and the opposite side of the adjacent switch, and means for preventing more than one switch being closed at a time.

8. The combination with an electrical apparatus having a winding, and a supply circuit comprising a high and a low-tension conductor adapted to be connected to the respective ends of said winding, of a plurality of switches severally connected between the low-tension conductor and a plurality of different voltage points in said winding, a translating device connected between one side of one switch and the opposite side of the adjacent switch, electrically controlled selective means for governing the operation of said switches, and interlocking means for permitting the closure of only one switch at a time.

9. The combination with an electrical winding, and a plurality of supply circuit conductors adapted to be connected thereto, of means for connecting one of said conductors to any one of a plurality of different voltage taps of said winding without short-circuiting any portion of the winding and without interrupting the main circuit, said means embodying switches corresponding in number to the number of different voltage taps.

10. The combination with an electrical winding, and a plurality of supply circuit conductors adapted to be connected thereto, of means for connecting one of said conductors to any one of a plurality of different voltage taps of said winding without short-circuiting any portion of the winding and without interrupting the main circuit, said means embodying switches corresponding in number to the number of different voltage taps, and an inductive device adapted to be connected between adjacent voltage points of said winding.

11. An electrical winding having three voltage taps, and a conductor adapted to be connected thereto, of an inductive device permanently connected to the intermediate tap and to said conductor, and a plurality of switches for adjusting the connections of said conductor to said winding taps, whereby said conductor may be connected directly to any winding tap without opening the main circuit and without short-circuiting any section of the winding.

12. An electrical winding having three voltage taps, and a conductor adapted to be connected thereto, of an inductive device permanently connected to the intermediate tap and to said conductor, and a plurality of switches for connecting said inductive device between any two adjacent winding taps and for connecting said conductor to any of said taps.

13. The combination with an electrical winding having a plurality of voltage taps, and a conductor adapted to be connected thereto, of a plurality of switches equal in number to said taps and forming the sole means of connecting said conductor to the respective taps, and a translating device permanently connected between an intermediate tap and said conductor.

14. The combination with an electrical winding having three voltage taps, and a conductor having three branches, of three switches forming the sole means of connecting the corresponding taps and branches, and a translating device connected between the intermediate tap and said conductor.

15. The combination with an electrical winding having a plurality of voltage taps, and a conductor adapted to be connected thereto, of a plurality of switches equal in number to said taps and severally connected between said conductor and the respective voltage taps, and a translating device having its ends permanently connected to an intermediate tap and to said conductor, respectively, said end-connections constituting the sole junctions of said translating device with the remainder of the system.

16. The combination with an electrical winding having three voltage taps, and a conductor having three branches, of three switches forming the sole means of connecting the corresponding taps and branches, and a translating device having its ends permanently connected to the intermediate tap and to said conductor, respectively.

In testimony whereof, we have hereunto subscribed our names this 31st day of March, 1914.

KARL A. SIMMON.
ARTHUR J. HALL.

Witnesses:
C. C. WHITTAKER,
B. B. HINES.